United States Patent [19]
Morita et al.

[11] Patent Number: 5,652,499
[45] Date of Patent: Jul. 29, 1997

[54] POWER SUPPLY APPARATUS TO PROVIDE POWER TO ELECTRICAL EQUIPMENT FROM A PLURALITY OF BATTERY PACKS AND ITS METHOD OF POWER SUPPLY

[75] Inventors: Hideyo Morita, Sumoto; Takayuki Mino, Mihara-gun, both of Japan

[73] Assignee: Sanyo Electric Co., Ltd., Osaka, Japan

[21] Appl. No.: 602,418

[22] Filed: Feb. 16, 1996

[30] Foreign Application Priority Data

Feb. 20, 1995 [JP] Japan ................................ 7-031048
Apr. 27, 1995 [JP] Japan ................................ 7-103808

[51] Int. Cl.⁶ .......................... H01M 10/44; H01M 10/46
[52] U.S. Cl. .......................... 320/6; 320/2; 320/15
[58] Field of Search ........................ 320/2, 6, 7, 8, 320/15, 16, 18; 307/150

[56] References Cited

U.S. PATENT DOCUMENTS

| | | | |
|---|---|---|---|
| 3,919,615 | 11/1975 | Niecke | 320/2 |
| 4,296,461 | 10/1981 | Mallory et al. | 307/150 X |
| 4,748,344 | 5/1988 | Sing | 320/2 X |
| 5,121,046 | 6/1992 | McCullough | 320/16 |
| 5,477,123 | 12/1995 | Allen et al. | 320/2 |
| 5,510,690 | 4/1996 | Tanaka et al. | 320/2 |

FOREIGN PATENT DOCUMENTS 6-5311   1/1994   Japan .

*Primary Examiner*—Peter S. Wong
*Assistant Examiner*—Patrick B. Law
*Attorney, Agent, or Firm*—Wenderoth, Lind & Ponack

[57] ABSTRACT

The power supply apparatus of this invention has a portable case. The case is provided with battery attachment sections for attaching a plurality of battery packs containing rechargeable batteries, a charging circuit for charging battery packs, a charging power input section for supplying power to the charging circuit for battery pack charging, a discharge circuit for discharging battery packs to electrical equipment loads, and a discharge power output section for delivering output from the discharge circuit to external loads.

25 Claims, 11 Drawing Sheets

POWER SUPPLY APPARATUS TO PROVIDE POWER TO ELECTRICAL EQUIPMENT FROM A PLURALITY OF BATTERY PACKS AND ITS METHOD OF POWER SUPPLY

BACKGROUND OF THE INVENTION

This invention relates to a portable power supply apparatus, which houses a charging circuit and a discharging circuit, and to the method of power supply from this apparatus to electrical equipment.

In general, a battery pack which houses rechargeable batteries and which is detachable from electrical equipment is used as the power source for portable electrical equipment such as a video camera. When the battery pack has discharged, it is removed from the electrical equipment, attached to a battery charger separate from the electrical equipment, and charged for reuse.

Used in this manner, the battery pack containing rechargeable batteries is quite convenient. However, as the power source for electrical equipment, the battery pack must first be attached to the electrical equipment, removed from the electrical equipment when is has discharged, and attached to a battery charger for recharging. This operation is troublesome.

As one method of improving ease of operation, Japanese Non-examined Patent Publication No. 6-5311 issued Jan. 14, 1994 discloses a battery pack containing a charging circuit.

Typically, since one battery pack is attached to one electrical equipment unit and the usable time is short, spare battery packs are carried for long duration use in the field. Here, it is necessary to replace battery packs with spare battery packs whenever those attached to the electrical equipment become discharged. In this respect, a battery pack containing a charging circuit requires the same replacement procedure.

Thus the first object of the present invention is to provide a power supply apparatus which can be used for long duration without requiring battery pack detachment and reattachment, and which improves ease of operation by reducing detachment and attachment operations as much as possible.

The inventor and associates have developed a portable power supply apparatus on which a plurality of battery packs are mounted. Since this power supply apparatus delivers power to electrical equipment from a plurality of battery packs, it has the advantage that the usable time of the electrical equipment is extended compared to electrical equipment with a single battery pack attached. This configuration of power supply apparatus uses the plurality of battery packs in order by switching from one to the next. When the first battery pack output voltage drops to a final voltage level, the apparatus switches to the next battery pack to be used. The apparatus continues to switch from the battery pack in use to the next battery pack whenever output voltage drops to the final voltage level. Since the discharging battery pack is switched to a fully charged battery pack when its output voltage drops to the final voltage level, the output voltage of the power supply apparatus becomes greater than the final voltage level.

Incidentally, electrical equipment which use batteries as their power source can display remaining battery capacity to keep track of battery use. Remaining battery capacity is displayed by sensing battery voltage. The remaining battery capacity display function operates normally when the electrical equipment is powered by its internal batteries. However, when a power supply apparatus is connected to the electrical equipment and power is delivered from the power supply apparatus battery packs to the electrical equipment, the remaining battery capacity display function fails to operate properly. This is particularly noticeable, for example, when a battery pack containing lithium-ion rechargeable batteries, which reduce output voltage in proportion to remaining battery capacity, are attached to the power supply apparatus. A power supply apparatus, which has a battery pack containing lithium-ion rechargeable batteries attached, houses a DC—DC converter. The DC—DC converter is a stabilization circuit which stabilizes power supply apparatus output voltage by increasing output voltage when battery pack voltage drops due to discharge. When battery pack output voltage drops to the final voltage level, the power supply apparatus switches to use the next battery pack. However, although battery pack voltage drops, power supply apparatus output voltage does not drop.

Electrical equipment supplied by a constant output voltage from the power supply apparatus cannot display remaining battery capacity by sensing voltage. This has the disadvantage that remaining usable time is unknown and the equipment may become unusable without warning. Thus the second object of the present invention is to provide a power supply apparatus to provide power to electrical equipment from a plurality of battery packs and its method of power supply which avoids this disadvantage by supplying a stable output from the power supply apparatus to the electrical equipment and by allowing display of remaining battery capacity at the electrical equipment.

A power supply apparatus which provides power to electrical equipment from a plurality of battery packs has the further advantage that since the electrical equipment is driven by a plurality of battery packs, the usable time duration of the electrical equipment is lengthened considerably compared to electrical equipment containing a single battery pack. However, since power is not delivered directly from battery packs to the electrical equipment, this method of power delivery from a power supply apparatus has the disadvantage that power losses results from lead, contact terminal, and other voltage losses along the way from the battery packs. A power supply apparatus which houses a DC—DC converter can deliver power while compensating for voltage losses from the battery packs to the electrical equipment. A power supply apparatus with a simple circuit structure which does not house a DC—DC converter cannot deliver power to electrical equipment compensated for voltage losses. For this reason such an apparatus delivers voltage to electrical equipment which is lower than the output voltage of the battery packs.

Incidentally, if the battery pack voltage of an electrical equipment unit drops below a cut-off voltage, the power switch is forcibly turned off. This is to prevent overdischarge and performance degradation of the battery pack. The cut-off voltage where the electrical equipment turns the power switch off is set lower than the final voltage level where the power supply apparatus switches battery packs. If the cut-off voltage was set higher than the final voltage level, the electrical equipment power switch would be turned off before the power supply apparatus could switch battery packs and a plurality of battery packs could not be used.

In this manner, the fact that the power supply apparatus final voltage level must be set higher than the electrical equipment cut-off voltage combined with the fact that the battery pack output voltage is actually lower than the electrical equipment supply voltage means that the real capacity of the power supply apparatus battery packs is reduced. The third object of the present invention is to overcome this disadvantage. Thus the third object of the present invention is to provide a power supply apparatus to provide power to electrical equipment from a plurality of battery packs and it method of power supply which effectively uses the attached battery packs to allow long duration use of electrical equipment.

The above and further objects and features of the invention will more fully be apparent from the following detailed description with accompanying drawings.

SUMMARY OF THE INVENTION

The power supply apparatus of the present invention comprises a case that can be portable, a battery attachment section provided on the case for attachment of a plurality of battery packs containing rechargeable batteries, a charging circuit contained within the case, a charging power input section provided on the case for supplying power to the charging circuit to charge battery packs attached to the battery attachment section, a discharge circuit contained within the case, and a discharge power output section provided on the case for outputting discharge power from the battery packs attached to the battery attachment section through the discharge circuit to the outside world.

A plurality of battery packs containing rechargeable batteries are attached to the battery attachment section on the case of this type of power supply apparatus. The plurality of battery packs are charged by inputting power to the charging circuit through the charging power input section. After charging, power can be output from the battery packs, still attached to the battery attachment section on the case, through the discharge power output section.

Since this configuration of power supply apparatus uses a plurality of battery packs, ease of operation is improved by minimizing battery pack attachment and detachment. This configuration also has the advantage that is can be used for long duration.

A power supply apparatus may be provided with a cover, which is free to open and close, over the discharge power output section. A locking device linked to the cover may be provided to prevent movement of battery packs attached to the battery attachment section when the discharge power output section cover is open. A power supply apparatus provided with this discharge power output section cover reliably retains battery packs on the battery attachment section during discharge (portable operation) to prevent unexpected power interruption from battery pack disconnection due to vibration or shock.

A power supply apparatus provided with a display unit to indicate charge and discharge of battery packs attached to the battery attachment section has the display unit disposed on an upward facing inclined surface when the case is carried. This type of power supply apparatus has the feature that the battery pack charge or discharge state can be easily confirmed regardless of the form the apparatus is being used in.

A preferred embodiment of the power supply apparatus of the present invention delivers power to electrical equipment by switching consecutively to the plurality of attached battery packs. Further, except when delivering power from the battery pack used last, the power supply apparatus delivers power to electrical equipment by stabilizing the battery pack output voltage to a specified voltage. During power delivery from the last battery pack, the power supply apparatus allows the voltage supplied to the electrical equipment to decrease as the output voltage from the last battery pack decreases. This can be accomplished, for example, by direct supply of the last battery pack output voltage as the power supply apparatus output voltage, and supply of DC—DC converter stabilized voltage output for battery packs other than the last.

This configuration of power supply apparatus supplies output voltage stabilized by a circuit such as a DC—DC converter for all battery packs except that used last. Electrical equipment is thus supplied with a stable voltage over a long duration for normal electrical equipment operation. When the last battery is used, the power supply apparatus delivers power to the electrical equipment without stabilizing the battery pack output voltage. Consequently, when the last battery is used, the supply voltage to the electrical equipment drops as the battery pack's remaining battery capacity drops. Since the electrical equipment senses battery pack voltage to indicate remaining battery capacity, the remaining battery capacity is properly displayed when the last battery pack is being used. A plurality of battery packs can be used and sequentially switched until the last battery pack is used. When the last battery pack is used, the remaining battery capacity display of the electrical equipment operates properly and indicates how much longer is can be used. Therefore, the system can be conveniently used by periodically checking the remaining battery capacity without concern that the battery packs may suddenly becoming unusable.

It is also possible to supply stabilized output voltage to the electrical equipment from all battery packs and sense remaining battery pack capacity at the power supply apparatus. However, this method of sensing remaining battery pack capacity requires that the power supply apparatus be provided with battery capacity sensing and display functions. This is because the electrical equipment remaining battery capacity display function does not operate properly in this case. This system has the disadvantage that power supply apparatus cost is increased. The method of the present invention delivers stabilized power from the battery packs to the electrical equipment and also allows the remaining battery capacity display function of the electrical equipment to operate properly. This reduces power supply apparatus cost while providing proper display of remaining battery pack capacity.

The power supply apparatus of the present invention delivers power to electrical equipment by switching to each of the battery packs. However, once the output voltage of a plurality of battery packs has dropped to the final voltage level, multiple battery packs may also be connect in series to increase their output voltage and deliver power to electrical equipment.

In this power supply apparatus, a plurality of battery packs are switched to and used sequentially. After the voltage of a plurality of battery packs has dropped to the final voltage level, a plurality of battery packs are connected and used in series. The output voltage of series connected battery packs is a multiple of the output voltage of a single battery pack. This method has the advantage that a plurality of battery packs can be effectively used, without the use of a DC—DC converter or similar circuitry, until little battery capacity remains. In particular, since output voltage is increased by connecting a plurality of battery packs in series, there is no need for circuit elements designed to raise battery pack output voltage such as DC—DC converts. This power supply apparatus has the feature that actual usable battery pack capacity is increased with a simple apparatus.

DETAILED DESCRIPTION OF THE INVENTION

Figure 1:
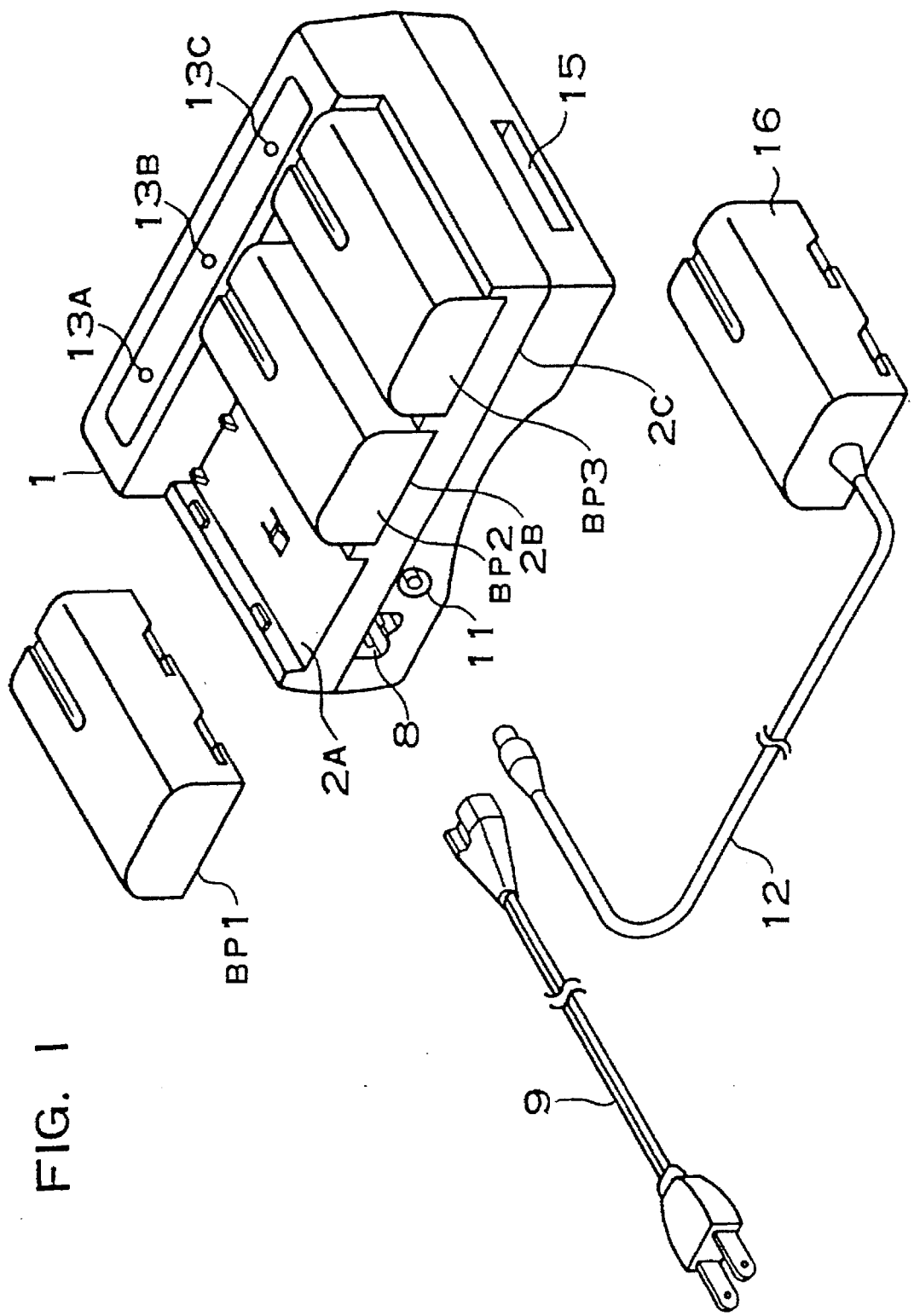
FIG. 1 is an oblique view showing the first embodiment of the present invention.
Figure 2:
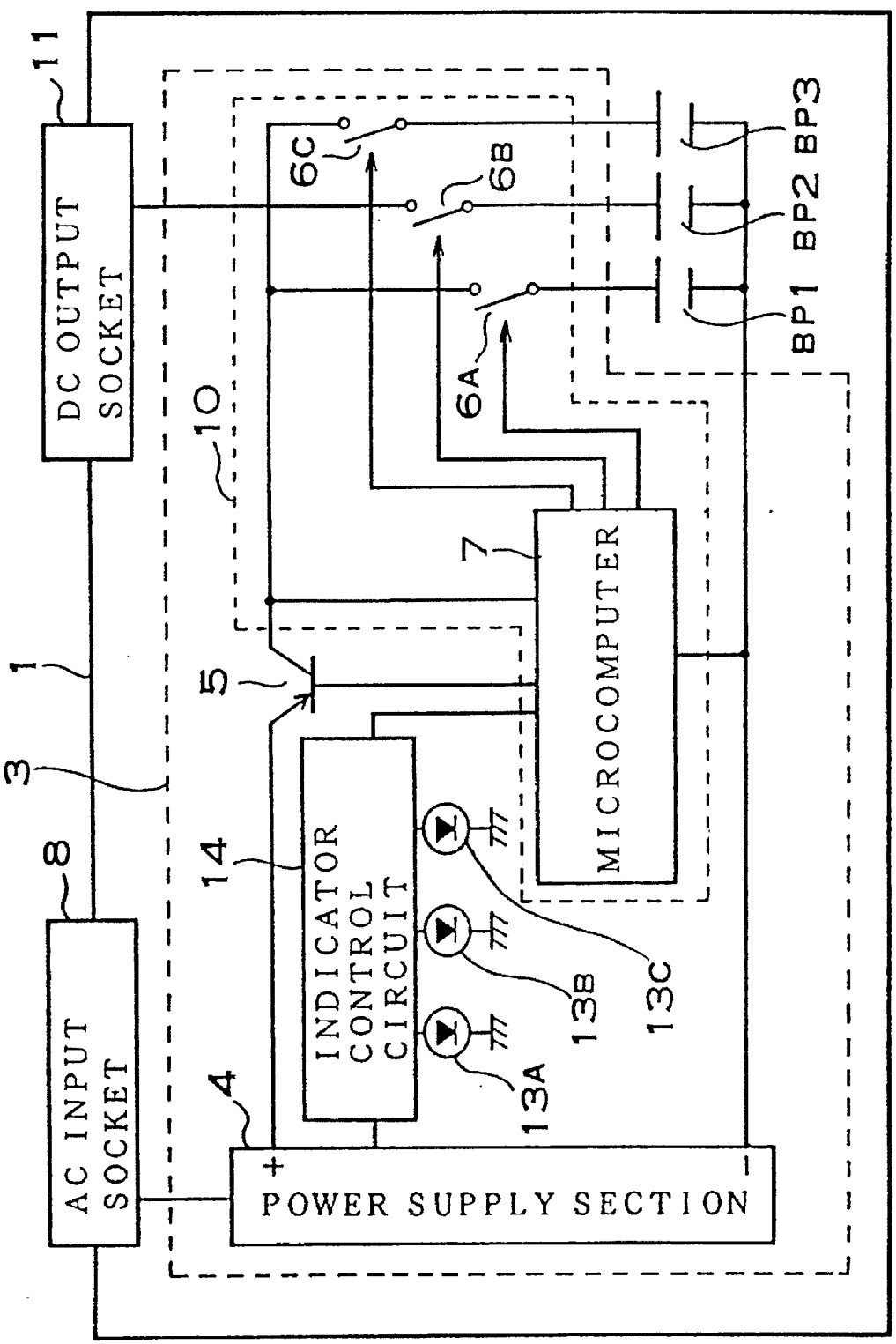
FIG. 2 is a block circuit diagram showing the first embodiment of the present invention.

FIGS. 1 and 2 are an oblique view and a block circuit diagram of the first embodiment of the present invention. Part No. 1 is a case formed of plastic which is portable. Part Nos. 2A–2C are battery attachment sections formed in the upper surface of the case 1 for attaching a plurality of battery packs BP1–BP3 (this embodiment has three battery packs). Each of the battery packs BP1–BP3 contains rechargeable batteries such as nickel-cadmium batteries, nickel-hydrogen batteries, or lithium-ion batteries, and each battery pack is provided with clamping grooves on the attachment surfaces that mate with the battery attachment sections 2A–2C. Each of the battery attachment sections 2A–2C also has clamping projections which fit in the clamping grooves of the battery packs BP1–BP3. Consequently, by sliding the battery packs BP1–BP3 such that the clamping projections of the battery attachment sections 2A–2C mate with the clamping grooves of the battery packs BP1–BP3, the battery packs BP1–BP3 are clamped into a fixed position within the battery attachment sections 2A–2C.

Part No. 3 is a charging circuit housed within the case 1. The charging circuit 3 is made up of a power supply section 4 for producing the specified DC power, a charge control switch 5, selection switches 6A–6C, and a microcomputer 7. Part No. 8 is an AC input socket provided in the case 1 to supply charging power through the charging circuit 3 to charge the battery packs BP1–BP3 attached to the battery attachment sections 2A–2C. Part No. 9 is an AC cord which connects the AC input socket 8 with a commercial AC power source (no illustrated). One end of the AC cord 9 has a jack which inserts into the AC input socket 8 and the other end has a plug which inserts into a commercial AC outlet.

Part No. 10 is a discharge circuit housed within the case 1. The discharge circuit 10 is made up of the selection switches 6A–6C, and the microcomputer 7 which are part of the previously described charging circuit 3. Part No. 11 is a DC output socket provided in the case 1 to output power discharged from the battery packs BP1–BP3, attached to the battery attachment sections 2A–2C, through the discharge circuit 10. Part No. 12 is a connecting cord which connects the DC output socket 11 with electrical equipment such as a video camera (not illustrated). One end of the connecting cord has a jack which inserts into the DC output socket 11 and the other end has an attachment portion 16 to mate with the electrical equipment. In this embodiment a video camera has been presumed as the electrical equipment and the attachment portion 16 of the connecting cord 12 takes the same shape as the battery packs BP1–BP3 allowing connection to the battery attachment section of the video camera.

Part Nos. 13A–13C are Light Emitting Diodes (LEDs) to display the charge or discharge of each battery pack BP1–BP3 mounted in each battery attachment section 2A–2C. These LEDs 13A–13C are disposed on the top surface of the case 1 locating them adjacent to their respective battery attachment sections 2A–2C. Part No. 14 is an indicator control circuit to supervise operation of the LEDs 13A–13C under microcomputer 7 control.

Part No. 15 is a slot formed through the back side of the case 1 allowing a belt (not illustrated) to be passed through the slot 15 and making the case 1 easily portable on a persons waist (or hip). Further, the back side of the case 1 is shaped somewhat concave allowing it to ride easily at the hip for good portability.

In this power supply apparatus, the battery packs BP1–BP3 residing in the battery attachment sections 2A–2C are charged by inputting AC power from the AC input socket 8. Charging in initiated by turning on the charge control switch 5 and selection switch 6A to charge battery pack BP1. When battery pack BP1 has finished charging, selection switch 6B is turned on to initiate charging of battery pack BP2. Similarly, when battery pack BP2 has finished charging, charging of battery pack BP3 is initiated, and when all battery packs BP1–BP3 have finished charging, the charge control switch 5 is turned off.

When each of the battery packs BP1–BP3 are being charged, each respective LED 13A–13C lights to allow the battery pack charging state to be known.

On the other hand, each of the battery packs BP1–BP3 are discharged through the connecting cord 12, which is connected between the DC output socket 11 and the electrical equipment such as a video camera (not illustrated). First, selection switch 6A is turned on to discharge battery pack BP1. When battery pack BP1 has completed discharge, selection switch 6B is turned on to initiate discharge of battery pack BP2. When battery pack BP2 has completed discharge, discharge of battery pack BP3 is initiated. During this discharge as well, the respective LED 13A–13C corresponding to each battery pack BP1–BP3 lights to inform the user of the discharge state of the battery packs BP1–BP3.

In this manner, the power supply apparatus of the present invention allows charging as well as discharging of battery packs BP1–BP3 while they are mounted on the case 1.

Figure 3:
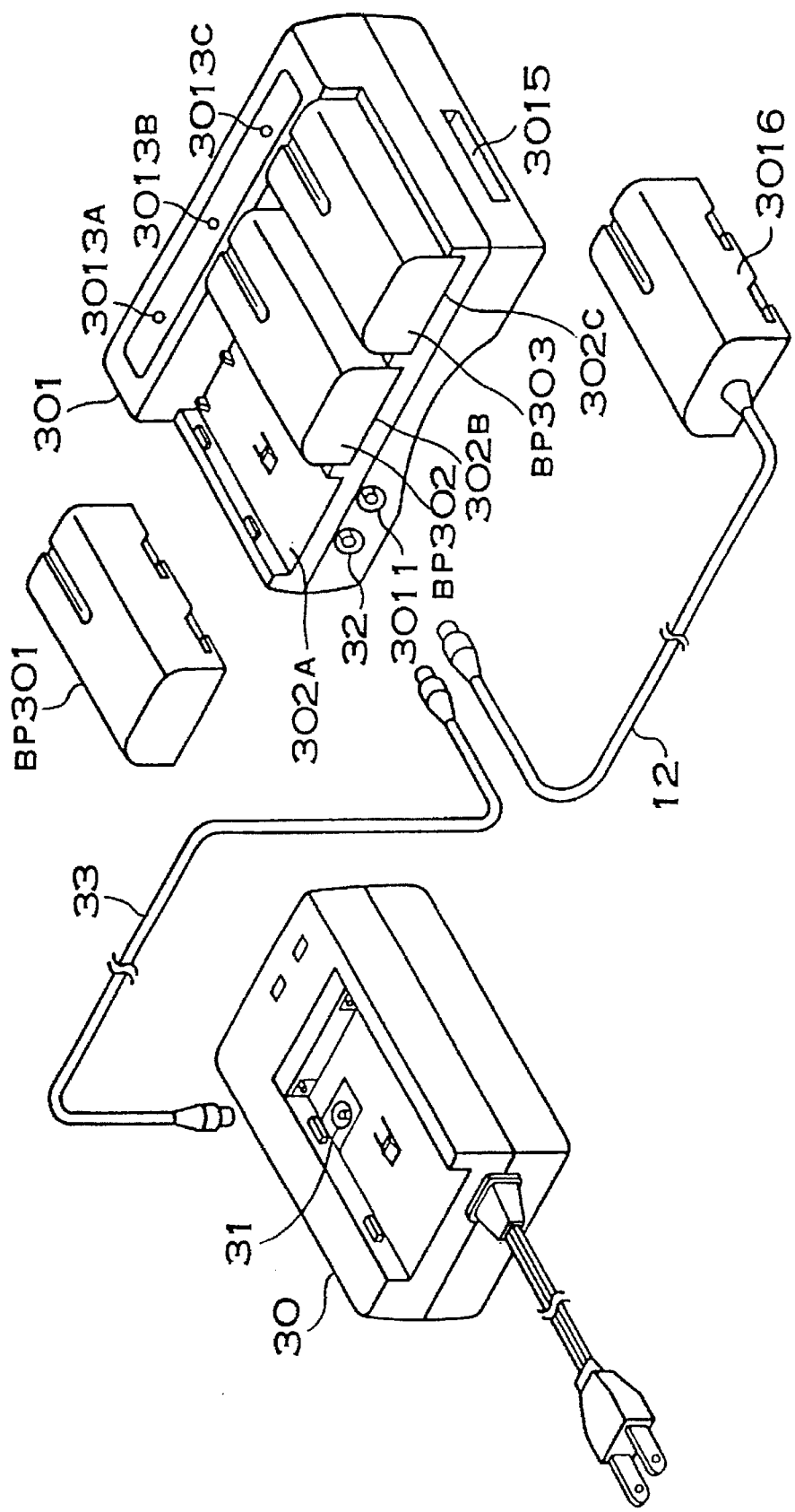
FIG. 3 is an oblique view showing the second embodiment of the present invention.

FIG. 3 is an oblique view of the second embodiment of the present invention. In this figure, 30 is a presently existing single battery pack battery charger, 31 are DC output terminals provided on the battery charger 30 to output a specified amount of DC power, 32 is a DC input socket provided on the case 301 of the power supply apparatus in place of the AC input socket 8 described in the previous embodiment, and 33 is a connecting cord which connects the DC output terminals 31 to the DC input socket 32. Note that in figures for his and the following embodiment, structural elements which are the same as those of the first embodiment have part numbers which have different first two digits but the same final digit(s) (least significant digits).

The power supply apparatus of this embodiment inputs DC power from the DC output terminals 31 of a presently existing battery charger 30 as opposed to the first embodiment which inputs AC power for charging. Consequently, the power supply section of this embodiment has a simplified circuit structure compared to that of the first embodiment since an AC to DC conversion circuit is not required.

Figure 4:
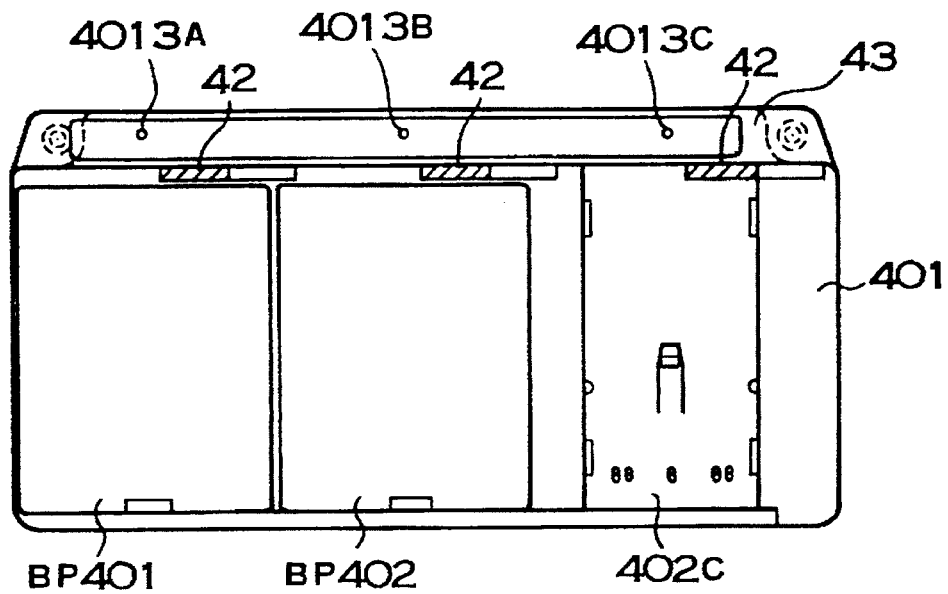
FIG. 4 is a plan view showing the third embodiment of the present invention.
Figure 5:
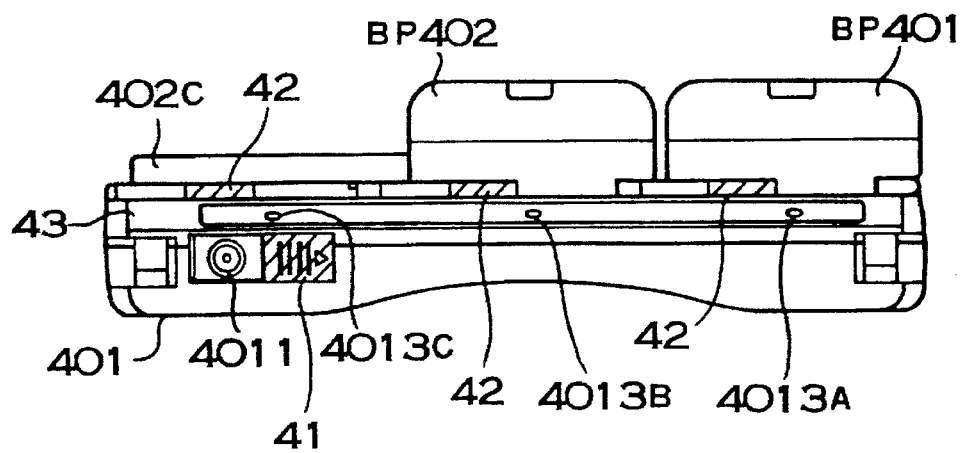
FIG. 5 is a front view showing the third embodiment of the present invention.
Figure 6:
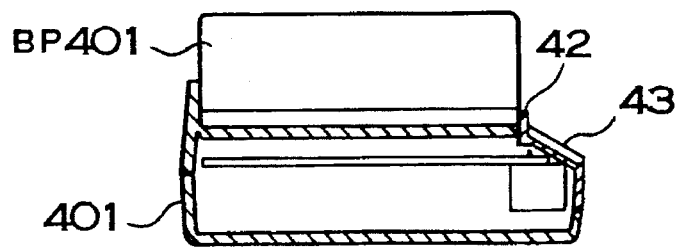
FIG. 6 is a cross-section view showing the third embodiment of the present invention.

FIGS. 4 through 6 show the third embodiment of the present invention. In these figures, 41 is a cover which is free to slide laterally to cover or uncover the DC output socket 4011, and 42 are locking pieces which are linked to the sliding cover 41 and move laterally to lock in place battery packs BP401–BP403 mounted in the battery attachment section 402A–402C when the cover 41 slides to pen the DC output socket 4011.

Part No. 43 is an oblique surface on which LEDs 4013A–4013C are mounted for displaying the charge or discharge state of the battery packs BP401–BP403 mounted in the battery attachment sections 402A–402C. This oblique surface 43 is disposed on top of the upper surface of the case 401 to face upward when the case 401 is carried in the portable mode.

When the case 401 is being carried and the cover 41 over the DC output socket 4011 is open to discharge battery packs BP401–BP403 mounted in the battery attachment sections 402A–402C, the lock 42 reliably prevents movement of the battery packs BP401–BP403 in this type of structure. Therefore, there is no unintentional disconnection of the battery packs BP401–BP403 from the battery attachment sections 402A–402C when the case 401 is being carried.

Further, since the LEDs 4013A–4013C are disposed on the oblique surface 43, they are easy to see whether the case 401 is laying on a table charging the battery packs BP401–BP403 or the case 401 is being carried and the battery packs BP401–BP403 are being discharged.

Figure 7:
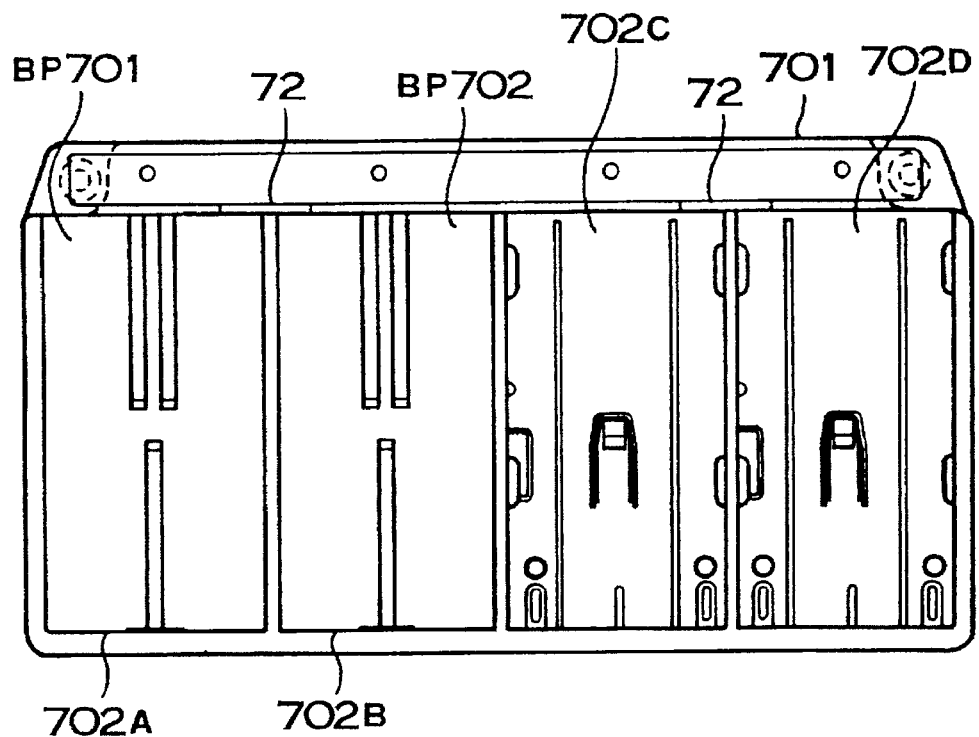
FIG. 7 is a plan view showing the fourth embodiment of the present invention.
Figure 8:
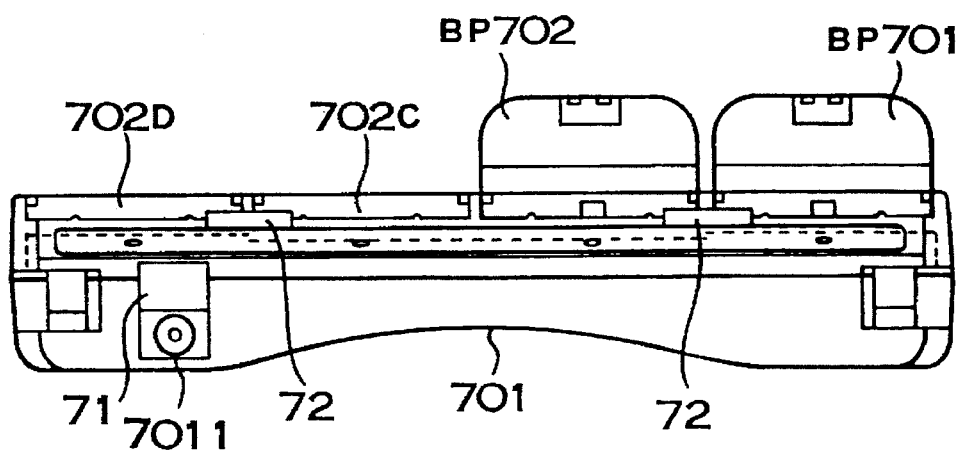
FIG. 8 is a front view showing the fourth embodiment of the present invention.

FIGS. 7 and 8 show the fourth embodiment of the present invention. In these figures, 71 is a cover which is free to slide vertically to cover or uncover the DC output socket 7011, and 72 are locking pieces free to protrude out or drop into the case 701 which are linked to the sliding cover 71 and protrude out to lock in place batter packs BP701–BP704 mounted in the battery attachment sections 702A–702D when the cover 71 slides to open the DC output socket 7011.

In this embodiment as well as in the third embodiment, when the case 701 is being carried and the cover 71 over the DC output socket 7011 is open to discharge battery packs BP701–BP704 mounted in the battery attachment section 702A–702D, the lock 72 reliably prevents movement in the battery attachment BP701–BP704. Therefore, there is no unintentional disconnection of the battery packs BP701–BP704 from the battery attachment sections 702A–702D when the case 701 is being carried.

Figure 9:
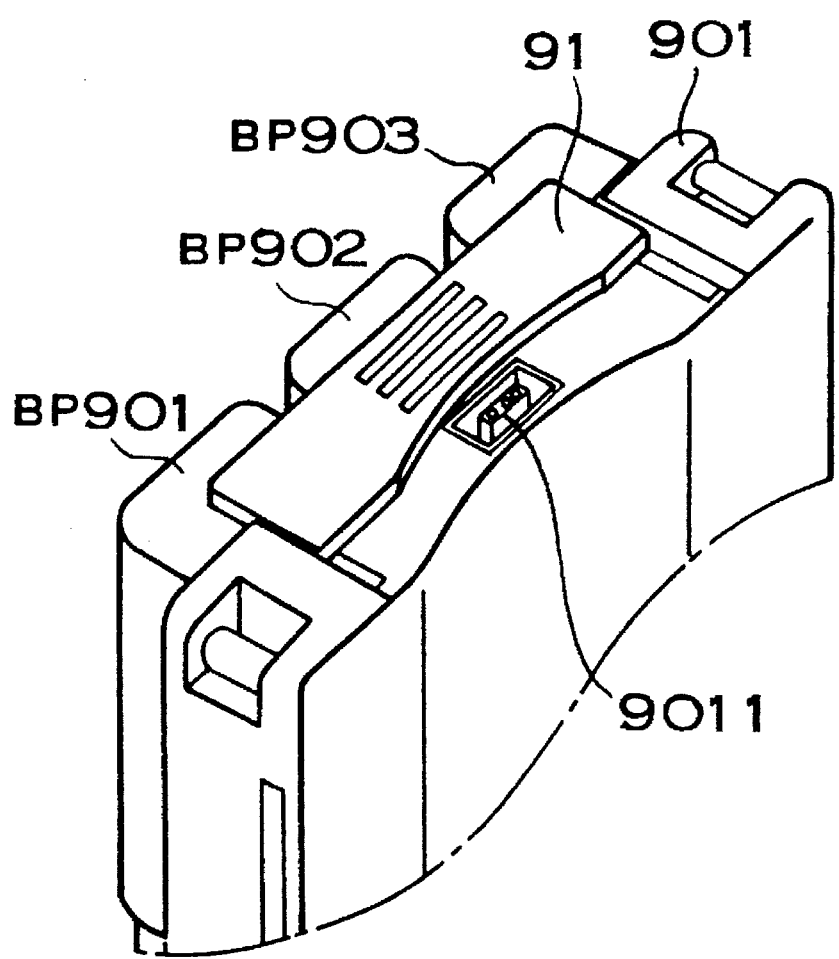
FIG. 9 is a partial oblique view showing important parts of the fifth embodiment of the present invention.

FIG. 9 shows the fifth embodiment of the present invention. In this figure, 91 is a cover which is free to slide vertically to cover or uncover the DC output socket 9011, and when this cover 91 slides to open the DC output socket 9011 it serves the dual purpose of locking in place battery packs BP901–BP903 mounted in the battery attachment sections 902A–902C.

In this embodiment in the same manner as for the third and fourth embodiments, when the case 901 is being carried and the cover 91 over the DC output socket 9011 is open to discharge battery packs BP901–BP903 mounted in the battery attachment sections 902A–902C, the cover 91 locks in place the battery packs BP901–BP903 to reliably prevent their movement.

Figure 10:
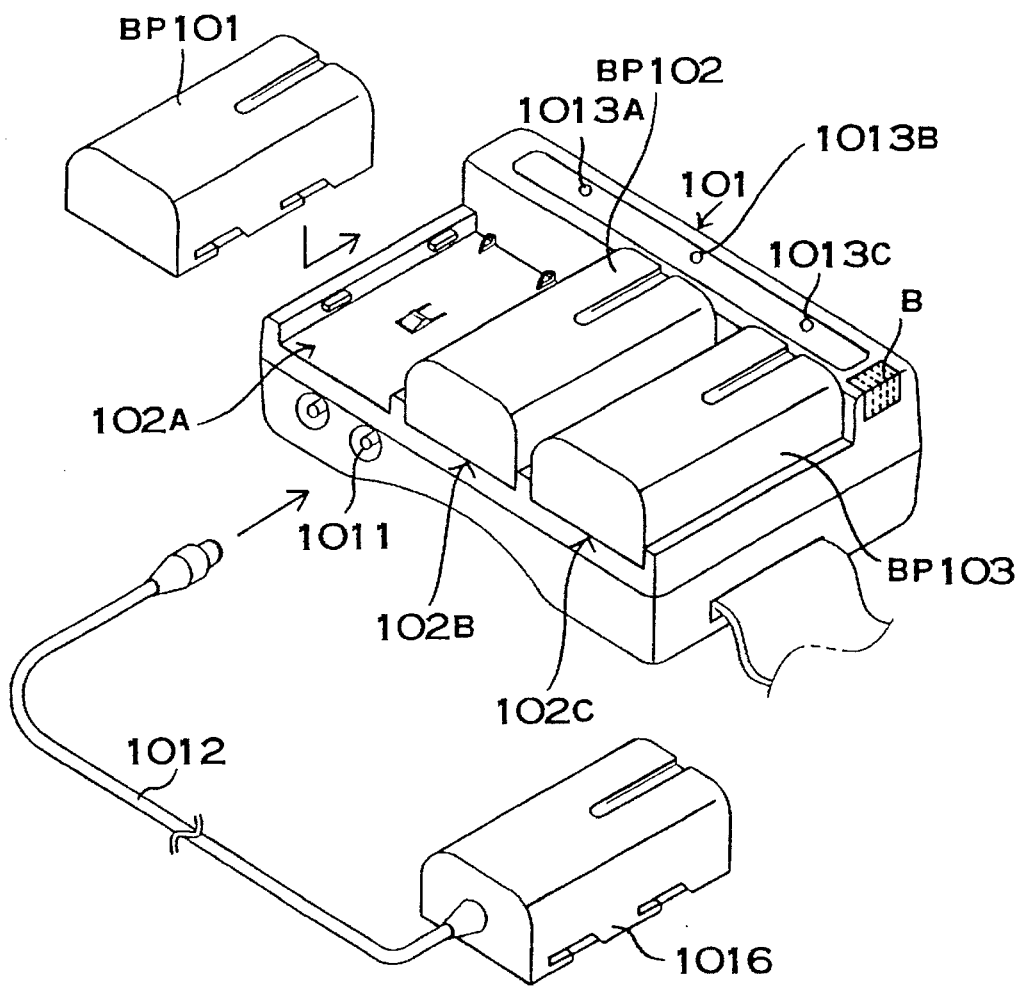
FIG. 10 is an oblique view showing the sixth embodiment of the present invention.

FIG. 10 shows the sixth embodiment of the present invention. The case 101 of the power supply apparatus shown in FIG. 10 is provided with battery attachment sections 102A–102C on its upper surface for mounting three battery packs BP101–BP103 in parallel rows and in a freely detachable manner. The battery packs BP101–BP103 attach to the battery attachment sections 102A–102C in the direction shown by the arrow in FIG. 10. Although FIG. 10 shows a case 101 with three battery packs BP101–BP103 attached, the power supply apparatus of the present invention is in no way restricted to three battery packs. Two battery packs, or four or more battery packs may be attached to the power supply apparatus.

Each of the battery packs BP101–BP103 attached to the case 101 contains a plurality of rechargeable batteries. The plurality of rechargeable batteries are connected in series. The batteries within the battery packs BP101–BP103 are rechargeable batteries such as nickel-cadmium batteries, nickel-hydrogen batteries, or lithium-ion batteries. A battery pack that contains lithium-ion rechargeable batteries has output voltage that decreases as the remaining battery capacity drops. The power supply apparatus can deliver power with litter voltage fluctuation to the electrical equipment by stabilizing the output voltage from a battery pack containing lithium-ion rechargeable batteries using a DC—DC converter.

The case 101 shown in FIG. 10 is connected with an attachment section 1016 to deliver power to the electrical equipment. The attachment portion 1016 connects with the case 101 through a connected cord 1012. The attachment portion 1016 has the same shape as each of the battery packs BP101–BP103. The attachment portion 1016 mounts on the electrical equipment replacing a battery pack and delivers power from the case 101 to the electrical equipment. Consequently, the attachment portion 1016 is provided with connecting terminals (not illustrated) in the same positions as a battery pack for connection to the electrical equipment.

The case 101 shown in FIG. 10 has LEDs 1013A–1013C disposed above the battery packs BP101–BP103. During battery pack discharge one of the LEDs 1013A–1013C lights to indicate which of the battery packs BP101–BP103 is being used. The battery packs BP101–BP103 are discharged in order from right to left or from left to right. Further, the case 101 shown in FIG. 10 also houses a buzzer B. The buzzer B issues a warning prior to the last battery pack reaching nearly full discharge.

Figure 11:
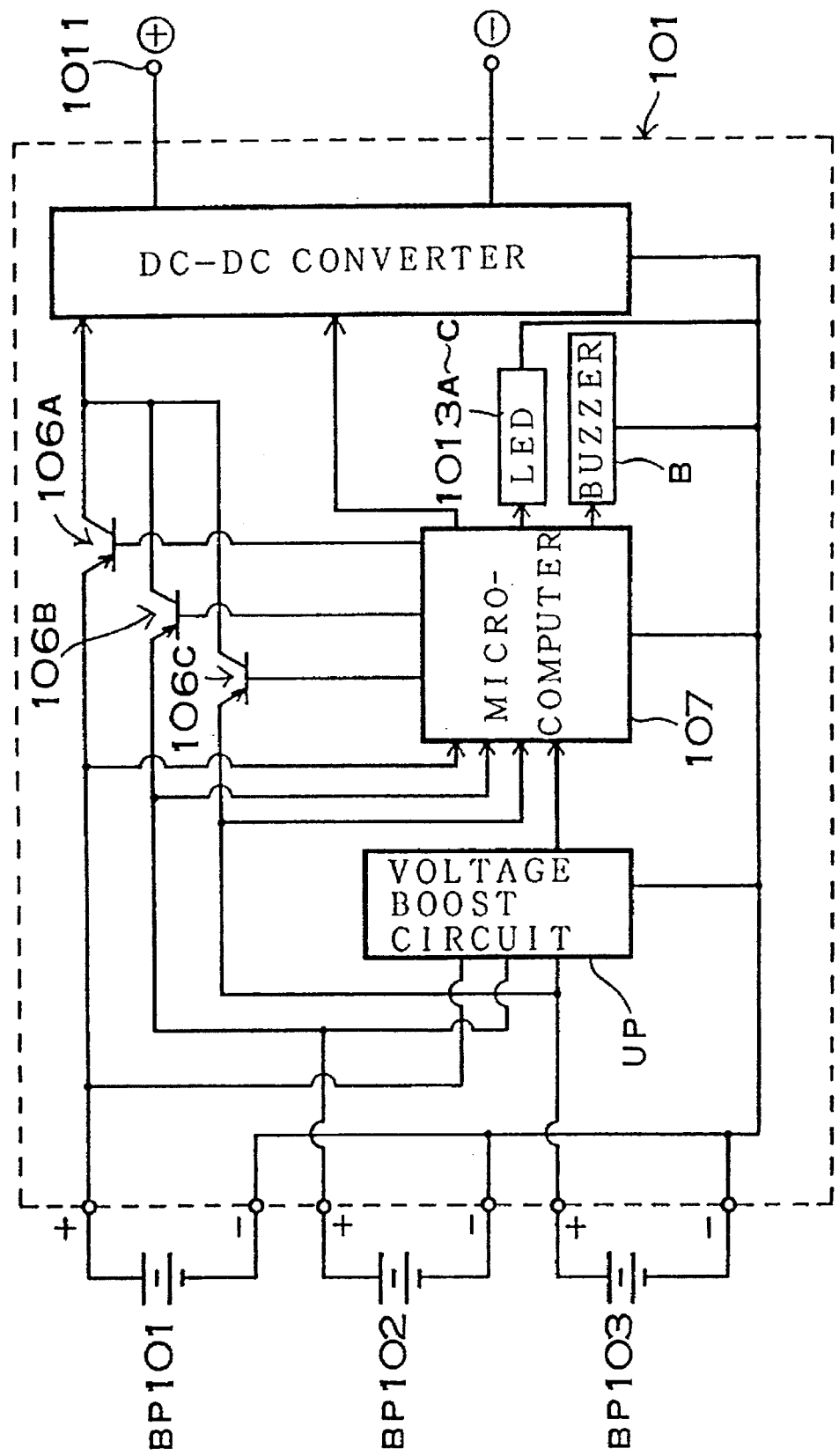
FIG. 11 is a circuit diagram of the power supply apparatus shown in FIG. 10.

FIG. 11 is a circuit diagram of the power supply apparatus shown in FIG. 10. This power supply apparatus comprises a DC—DC converter to output a stabilized voltage from the battery packs BP101–BP103, switching devices 106A–106C to switch battery pack discharge among the three battery packs BP101–BP103, a microcomputer 107 which is the control circuit for the switching devices 106A–106C and the DC—DC converter, a voltage boost circuit UP to increase the output voltage from the battery packs BP101–BP103 and supply power to operate the microcomputer 107, the LEDs 1013A–1013C for displaying output signals from the microcomputer 107, and the buzzer B.

The microcomputer 107 detects the voltage of the discharging battery packs BP101–BP103 and controls the switching devices 106A–106C to switch from the presently discharging battery pack to the next battery pack when the detected voltage drops to the final voltage level. The microcomputer 107 controls the switching devices 106A–106C to discharge the battery packs in the order BP101, BP102, and BP103. A given battery pack is discharged through the switching devices 106A–106C by turning on the switching device for the discharging battery and turning all other switching devices off.

The microcomputer 107 issues control signals to the DC—DC converter to control the output voltage of the DC—DC converter. When battery packs BP101 and BP102 are being discharged, the microcomputer 107 controls the DC—DC converter output voltage to a constant voltage stabilizing the power supply apparatus output. When battery pack BP103 is being discharged, the microcomputer 107 controls the DC—DC converter output voltage to decrease in proportion to the decrease in battery pack voltage.

Figure 12:
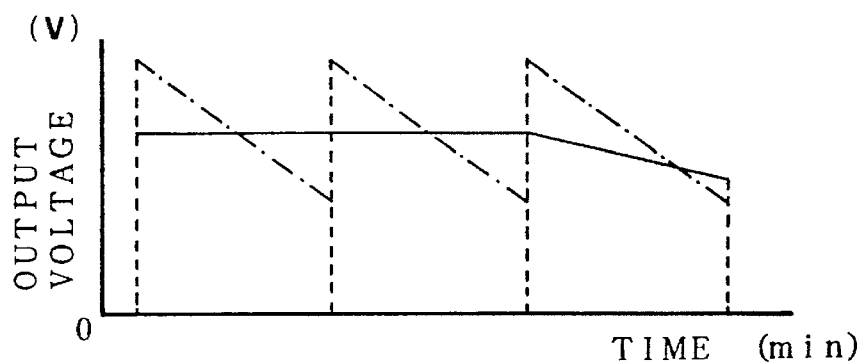
FIG. 12 is a graph showing the output voltage of the power supply apparatus shown in FIG. 10.

FIG. 12 is a graph showing battery pack voltage and power supply apparatus output voltage. In this graph, the broken lines containing points show the battery pack output voltage and the solid line shows the power supply apparatus output voltage. Under microcomputer control, the DC—DC converter stabilizes the output voltage to a constant voltage level while battery packs BP101 and BP102 are discharged. The stabilized DC—DC converter output voltage value is preferably set between the output voltage of a fully charged battery pack and the final voltage level. Ideally, it is set approximately half way between the full charge voltage and the final voltage level. However, it goes without saying that the DC—DC converter output voltage can also be made equal to the full charge voltage.

When battery pack BP103 is being discharged, the power supply apparatus output voltage decreases in proportion to the drop in battery pack voltage. Under microcomputer control, the DC—DC converter decreases the output voltage. As shown in FIG. 12, the power supply apparatus output voltage is proportional to the decrease in battery pack voltage, but the rate of voltage decrease is less than that of the battery pack. However, when battery pack BP103 is being discharged, the battery pack output may also be directly connected to the power supply apparatus output without passing through a DC—DC converter making the power supply apparatus output voltage equal to the battery pack output voltage.

The power supply apparatus circuit shown in FIG. 11 sequentially switches to discharge the three battery packs BP101–BP103 and, except for battery pack BP103 used last, supplies DC—DC converter stabilized power to the electrical equipment when battery packs BP101 and BP102 are discharging. When supplying power to the electrical equipment from the last battery pack BP103, the power supply apparatus decreases the voltage supplied to the electrical equipment in proportion to the decrease in battery pack output voltage. For this reason, the electrical equipment detects the voltage of the last used battery pack BP103 and correctly indicates the remaining battery capacity.

Figure 13:
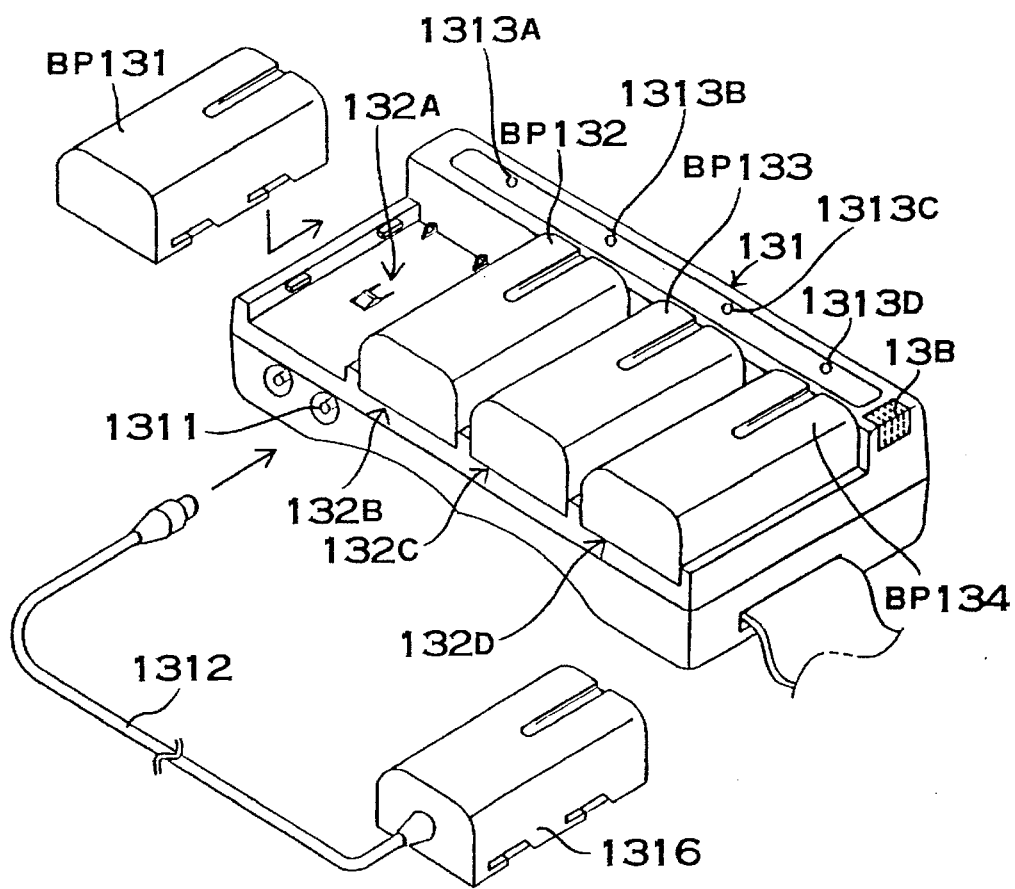
FIG. 13 is an oblique view showing the seventh embodiment of the present invention.
Figure 14:
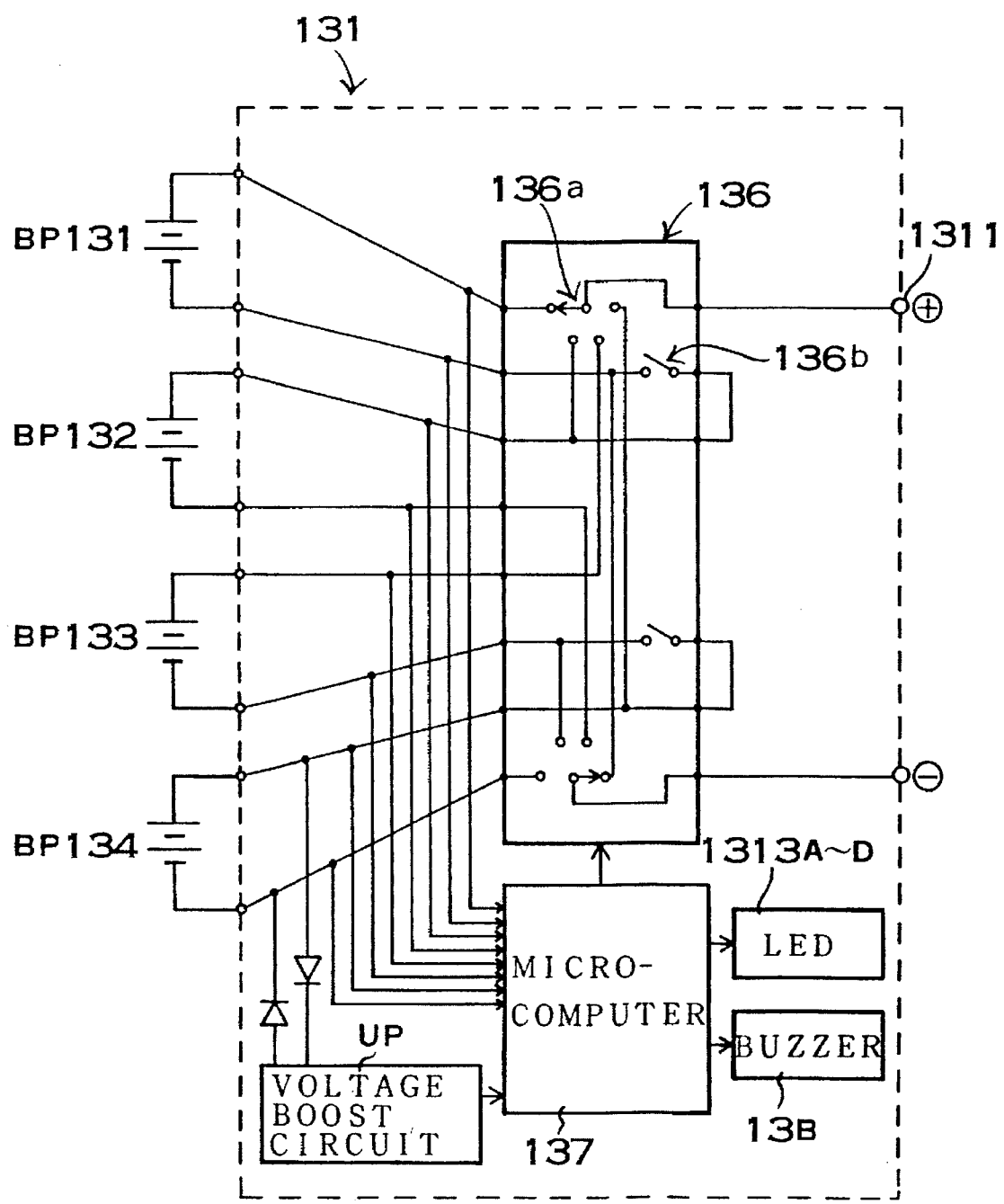
FIG. 14 is a circuit diagram of the power supply apparatus shown in FIG. 13.

Turning to FIG. 13, the power supply apparatus shown is the seventh embodiment of the present invention and has four battery packs BP131–BP134 which mount in a detachable fashion. FIG. 14 shows the circuit diagram of this power supply apparatus. The power supply apparatus shown in these figures comprises a selection switch 136 to connect battery packs BP131–BP134 to the DC output socket 1311 in the case 131, a microcomputer 137 to control the selection switch 136, a voltage boost circuit UP to increase the output voltage from the battery packs BP131–BP134 and supply power to operate the microcomputer 137, LEDs 131A–131D for displaying output signals from the microcomputer 137, and a buzzer B. The power supply apparatus of these figures is not equipped with a DC—DC converter to stabilize the output of the battery packs BP131–BP134. The output voltage of the battery packs BP131–BP134 is not voltage controlled by a DC—DC converter. The output of the battery packs BP131–BP134 is directly output from the power supply apparatus.

The microcomputer 137 detects the voltage of the discharging battery packs BP131–BP134 and controls the selection switch 136 to switch from the currently discharging battery pack to the next battery pack when the detected voltage drops to the final voltage level. The microcomputer 137 discharges the battery packs in the order BP131, BP132, BP133, and BP134. After all battery packs have discharged to the final voltage level, battery packs BP131 and BP132 are connected in series and to the output. Subsequently, battery packs BP133 and BP134 are connected in series and to the output.

Figure 15:
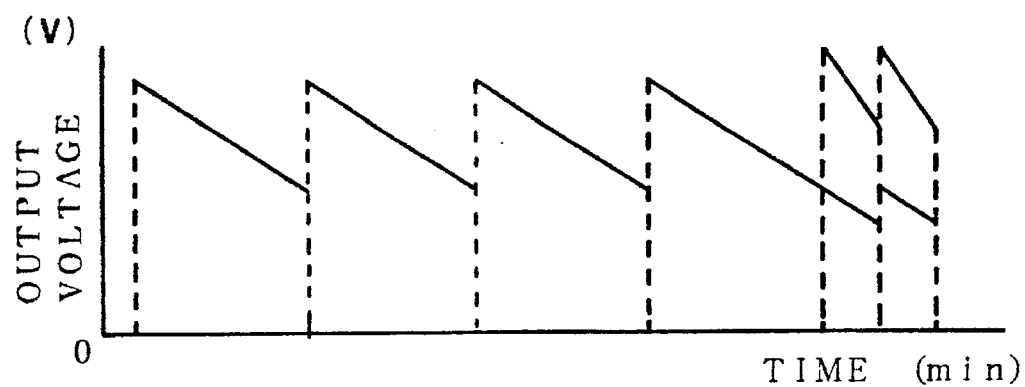
FIG. 15 is a graph showing the output voltage of the power supply apparatus shown in FIG. 13.

FIG. 15 is a graph showing the power supply apparatus output voltage while sequentially switching discharge from one battery pack to the next. The battery packs are discharged in the order BP131, BP132, BP133, and BP134. The discharge of each battery pack is stopped when its output voltage reaches the final voltage level, at which point the next battery pack is switched to. When discharge of battery packs BP131–BP134 is complete, BP131 and BP132 are connected in series and discharged. When the voltage of battery packs BP131 and BP132 reaches a cut-off voltage, their discharge is stopped. Subsequently, battery packs BP133 and BP134 are connected in series and discharged. Again, when the voltage of these battery packs BP133 and BP134 reaches the cut-off voltage, their discharge is stopped.

The selection switch 136 which discharges battery packs BP131–BP134 according to the previous scenario is provided with main switches 136a which connect to the + and − terminals of the DC output socket 1311, and intermediate switches 136b which connect battery packs BP131 and BP132 and battery packs BP133 and BP134 in series. To simplify understanding of the operation of the power supply apparatus shown in FIG. 14, switches with mechanically moving parts are used for the main switches 136a and the intermediate switches 136b. Needless to say, the main switches 136a and intermediate switches 136b can be semiconductor switching devices such as bipolar transistors or Field Effect Transistor (FET).

The main switches 136a and intermediate switches 136b are controlled by the microcomputer 137. The main switches 136a are two-circuit, four-contact switches. The intermediate switches 136b are on-off switches. The two-circuit main switches 136a sequentially connect to the + and − battery pack terminals to the + and − terminals of the DC output socket 1311 of the power supply apparatus discharging in order the battery packs BP131–BP134 to the final voltage level. At this time the intermediate switches 136b are maintained in the off state. After all battery packs have been discharged to the final voltage level, each of the battery packs BP131–BP134 are further discharged to the cut-off voltage in the manner described below.

(1) The intermediate switch 136b between BP131 and BP132 is turned on. At this time the intermediate switch 136b between BP133 and BP134 can be either on or off. This is because battery packs BP133 and BP134 are disconnected from the DC output socket 1311 at this time.

(2) the main switches 136a are controlled to connect the + terminal of battery pack BP131 to the + terminal of the power supply apparatus DC output socket 1311, and connect the − terminal of the battery pack BP132 to the − terminal of the power supply apparatus DC output socket 1311.

In this configuration, battery packs BP131 and BP132 are connected in series across the + and − terminals of the DC output socket 1311. Battery packs BP131 and BP132 are discharged in this configuration until their voltage drops to the cut-off voltage.

(3) When the BP131 and BP132 battery pack voltage drops to the cut-off voltage, the intermediate switch 136b between battery pack BP133 and BP134 is turned on. At this time as well, the intermediate switch 136b between BP131 and BP132 can be either on or off. This is because battery packs BP131 and BP132 will be disconnected from the DC output socket 1311.

(4) The main switches 136a are controlled to connect the + terminal of battery pack BP133 to the + terminal of the power supply apparatus DC output socket 1311, and connect the − terminal of battery pack BP134 to the − terminal of the power supply apparatus DC output socket 1311.

In this configuration, battery packs BP133 and BP134 are connected in series across the + and − terminals of the DC output socket 1311. Battery packs BP133 and BP134 are discharged in this configuration until their voltage drops to the cut-off voltage.

The power supply apparatus shown in FIG. 13 also has LEDs 131A–131D disposed above the battery packs BP131–BP134. During battery pack discharge one of the LEDs 131A–131D lights to indicate which of the battery packs BP131–BP134 is being used. The battery packs are discharged in order from right to left or from left to right. Further, the power supply apparatus shown in FIG. 13 also houses a buzzer 13B. The buzzer 13B issues a warning prior to the last battery pack reaching nearly full discharge.

Figure 16:
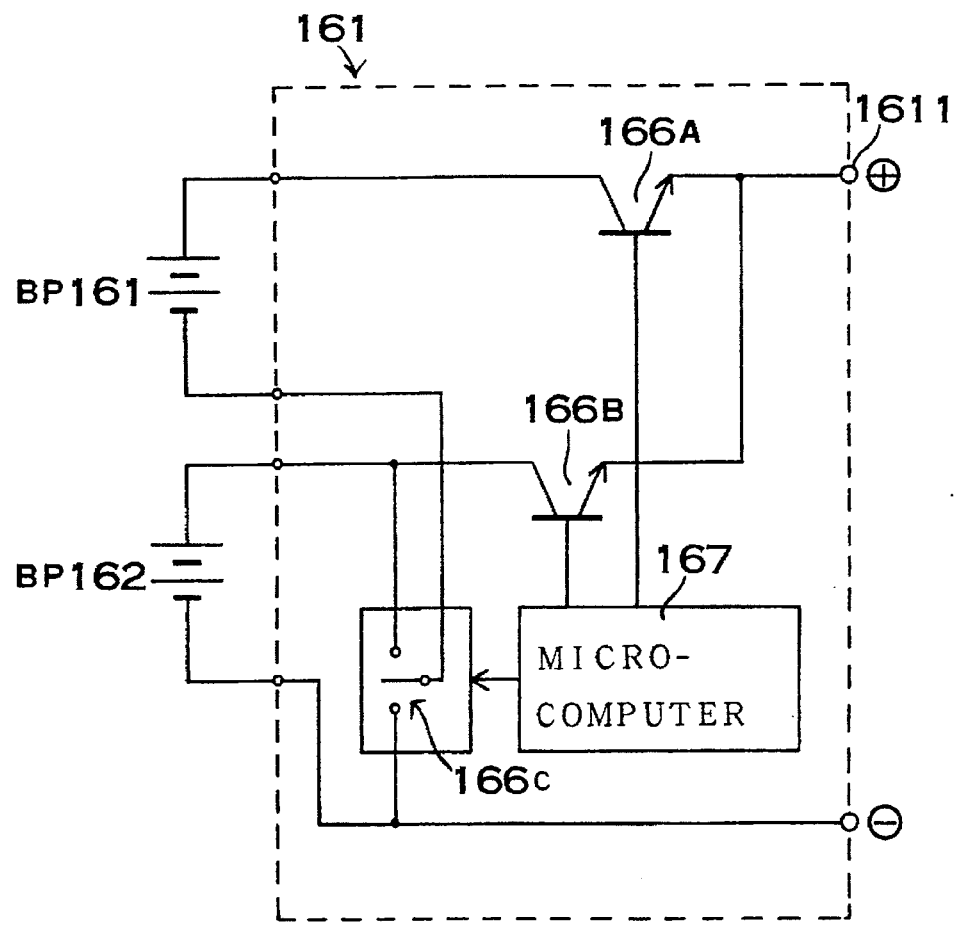
FIG. 16 is a circuit diagram of the power supply apparatus of the eighth embodiment of the present invention.

The power supply apparatus shown in FIGS. 13 and 14 uses four battery packs. Turning to FIG. 16, the power supply apparatus shown discharges two battery packs. The power supply apparatus of this figure connects the + side of each battery pack with the DC output socket 1611 through switching devices 166A and 166B. Selection switch 166c connects to the − side of the battery pack BP161 and to the + and − sides of battery pack BP162. Selection switch 166c is a single-circuit, double-contact switch. The selection switch 166c and the switching devices 166A and 166B are controlled by the microcomputer 167.

The power supply apparatus shown in the circuit diagram of FIG. 16 discharges battery packs BP161 and BP162 to the cut-off voltage in the following manner.

(1) Selection switch 166c connects the − side of battery pack BP161 to the − side of the power supply apparatus DC output socket 1611.

(2) The switching device 166A connected to battery pack BP161 is turned on, and the switching device 166B connected to battery pack BP162 is turned off.

In this configuration, battery pack BP161 is connected to the power supply apparatus DC output socket 1611 for discharge.

(3) When the voltage of battery pack BP161 drops to the final voltage level, the microcomputer 167 detects this, turns selection switch 166c off, turns the switching device 166B connected to battery pack BP162 on, and turns the switching device 166A connected to the battery pack BP161 off.

In this configuration, battery pack BP162 is discharged.

(4) When the voltage of battery pack BP162 drops to the final voltage level, the microcomputer 167 turns the switching device 166B connected to battery pack BP162 off, turns the switching device 166A connected to battery pack BP161 on, and using the selection switch 166c, connects the − side of battery pack BP161 to the + side of battery pack BP162.

In this configuration, battery packs BP161 and BP162 are connected in series across the power supply apparatus DC output socket 1611 for discharge.

(5) When the voltage of the series connected battery packs BP161 and BP162 drops to the cut-off voltage, the battery packs are disconnected from the power supply apparatus DC output socket 1611 by turning off both switching devices 166A and 166B and the selection switch 166c.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claim s or equivalence of such meets and bounds thereof are therefore intended to be embraced by the claims.

What is claimed is:

1. A power supply apparatus to provide power to electrical equipment from a plurality of battery packs containing rechargeable batteries, said power supply apparatus comprising:

(1) a case which is portable and is provided with battery attachment sections for attaching the plurality of battery packs containing the rechargeable batteries;

(2) a charging circuit housed within said case for charging the battery packs when attached to said battery attachment sections;

(3) a charging power input section provided in said case to supply charging power to said charging circuit for charging the battery packs when attached to the battery attachment sections;

(4) a discharge circuit housed within said case for sequentially switching discharge from one of the plurality of battery packs to another; and (5) a discharge power output section provided in said case to output discharge power from the battery packs, when attached to the battery attachment sections, through said discharge circuit for external use.

2. A power supply apparatus as recited in claim 1 wherein said case is provided with a carrying belt for portability.

3. A power supply apparatus as recited in claim 1, wherein said battery attachment section are arranged so that, when the plurality of battery packs are attached thereto, the plurality of battery packs are disposed relative to one another in a linear manner.

4. A power supply apparatus as recited in claim 1 wherein the discharge circuit is provided with selection switches to switch battery pack discharge and a microcomputer to control said selection switches.

5. A method of power supply from a plurality of battery packs to electrical equipment as recited in claim 1, wherein the battery packs which the attachment sections are configured to attach each has an elongated shape with opposing sides and opposing ends, and the battery attachment sections are arranged so that, when the plurality of battery packs are attached thereto, the plurality of battery packs are disposed relative to one another in a linear manner with respective sides thereof facing one another.

6. A power supply apparatus to provide power to electrical equipment from a plurality of battery packs containing rechargeable batteries, said power supply apparatus comprising:

(1) a case which is portable and is provided with battery attachment sections for attaching the plurality of battery packs containing the rechargeable batteries;

(2) a charging circuit housed within said case for charging the battery packs when attached to said battery attachment sections;

(3) a charging power input section provided in said case to supply charging power to said charging circuit for charging the battery packs when attached to the battery attachment sections;

(4) a discharge circuit housed within said case;

(5) a discharge power output section provided in said case to output discharge power from the battery packs, when attached to the battery attachment sections, through said discharge circuit for external use; and (6) a cover free to open and close said discharge power output section, and locking pieces linked to movement of said cover such that when said discharge power output section is open, movement of battery packs attached to the battery attachment sections is prevented.

7. A power supply apparatus to provide power to electrical equipment from a plurality of battery packs containing rechargeable batteries, said power supply apparatus comprising:

(1) a case which is portable and is provided with battery attachment sections for attaching the plurality of battery packs containing the rechargeable batteries;

(2) a charging circuit housed within said case for charging the battery packs when attached to said battery attachment sections;

(3) a charging power input section provided in said case to supply charging power to said charging circuit for charging the battery packs when attached to the battery attachment sections;

(4) a discharge circuit housed within said case;

(5) a discharge power output section provided in said case to output discharge power from the battery packs, when attached to the battery attachment sections, through said discharge circuit for external use; and (6) an oblique surface formed on said case and disposed to face upwards when said case is carried, and display devices provided on said oblique surface to indicate charge and discharge of battery packs attached to the battery attachment sections.

8. A power supply apparatus to provide power to electrical equipment from a plurality of battery packs containing rechargeable batteries, said power supply apparatus comprising:

(1) a case which is portable and is provided with battery attachment sections for attaching the plurality of battery packs containing the rechargeable batteries;

(2) a charging circuit housed within said case for charging the battery packs when attached to said battery attachment sections;

(3) a charging power input section provided in said case to supply charging power to said charging circuit for charging the battery packs when attached to the battery attachment sections;

(4) a discharge circuit housed within said case;

(5) a discharge power output section provided in said case to output discharge power from the battery packs, when attached to the battery attachment sections, through said discharge circuit for external use; and (6) wherein the charging circuit is provided a power supply section to output DC power to charge the battery packs, a charge control switch connected to the power supply section to control a charge state of the battery packs, selection switches to switch charging among the plurality of battery packs, and a microcomputer to control the selection switches.

9. A power supply apparatus as recited in claim 8 wherein the power supply section for charging the battery packs is housed within the case.

10. A power supply apparatus as recited in claim 8 wherein the power supply section for charging battery packs is external to the case, and power to charge the battery packs is supplied from the external power supply section to the case.

11. A power supply apparatus to provide power to electrical equipment from a plurality of battery packs containing rechargeable batteries, said power supply apparatus comprising:

(1) a case which is portable and is provided with battery attachment sections for attaching the plurality of battery packs containing the rechargeable batteries;

(2) a charging circuit housed within said case for charging the battery packs when attached to said battery attachment sections;

(3) a charging power input section provided in said case to supply charging power to said charging circuit for charging the battery packs when attached to the battery attachment sections;

(4) a discharge circuit housed within said case;

(5) a discharge power output section provided in said case to output discharge power from the battery packs, when attached to the battery attachment sections, through said discharge circuit for external use; and (6) an output cord which connects with said discharge power output section and supplies power from the case to electrical equipment.

12. A power supply apparatus as recited in claim 11 wherein an end of said output cord is connected to an attachment portion with the same shape as a battery pack, and the attachment portion attaches to electrical equipment to supply power from the case to the electrical equipment.

13. A power supply apparatus to provide power to electrical equipment from a plurality of battery packs, comprising:

(1) selection switches to switch discharge among the plurality of battery packs;

(2) a stabilizing circuit to regulate the output voltage of the battery pack selected by the selection switches; and (3) a control circuit to control the stabilizing circuit to supply battery pack output voltage to the electrical equipment which is stabilized to a specified voltage when power is supplied to the electrical equipment from each of the battery packs other than the battery pack which is last to be discharged, and to supply power to the electrical equipment which has a voltage that decreases as battery pack output voltage decreases when power is supplied to the electrical equipment from the battery pack which is last to be discharged.

14. A power supply apparatus as recited in claim 13 wherein the stabilizing circuit is a DC—DC converter which regulates battery pack output voltage and supplies power to the electrical equipment, and the control circuit is a microcomputer which controls the DC—DC converter.

15. A power supply apparatus as recited in claim 14 wherein the DC—DC converter regulates battery pack output voltage to a constant voltage and supplies power to the electrical equipment from all battery packs except the battery pack which is last to be discharged.

16. A power supply apparatus as recited in claim 14 wherein the DC—DC converter supplies power to the electrical equipment from the battery pack which is last to be discharged and regulates the voltage to have smaller voltage variation than the output from the battery pack which is last to be discharged.

17. A method of power supply from a plurality of battery packs to electrical equipment, comprising the steps:

(1) supplying power to electrical equipment which is battery pack output voltage stabilized to a specified voltage for all battery packs except the battery pack which is last to be discharged, and (2) decreasing the voltage of power supplied to electrical equipment as an output voltage of the battery pack which is last to be discharged decreases, when power is supplied to electrical equipment from the battery pack which is last to be discharged.

18. A method of power supply from a plurality of battery packs to electrical equipment as recited in claim 17 wherein battery pack output voltage is stabilized to a specified voltage by a DC—DC converter when supplying power to electrical equipment from all of the battery packs except the battery pack which is last to be discharged.

19. A method of power supply from a plurality of battery packs to electrical equipment as recited in claim 18 wherein the DC—DC converter is controlled by a microcomputer to supply power to electrical equipment.

20. A method of power supply from a plurality of battery packs to electrical equipment as recited in claim 18 wherein power is supplied to electrical equipment from the battery pack which is last to be discharged, and is regulated by the DC—DC converter to have less voltage variation than the battery pack output voltage.

21. A power supply apparatus to provide power to electrical equipment from a plurality of battery packs, comprising:

(1) selection switches to switch among the plurality of battery packs and supply power to electrical equipment from each of the battery packs sequentially; and (2) a control circuit to control the selection switches and, after battery pack output voltage has dropped to a final voltage level, supply power to electrical equipment by connecting a plurality of the battery packs in series.

22. A power supply apparatus as recited in claim 21 wherein the selection switches are provided with main switches to sequentially switch to each of the battery packs for discharge, and intermediate switches to connect a plurality of the battery packs in series.

23. A power supply apparatus as recited in claim 22 wherein an intermediate switch connects two of the battery packs in series to double the output voltage.

24. A method of power supply from a plurality of battery packs to electrical equipment, comprising the steps:

(1) switching to each of the battery packs sequentially and supplying power to electrical equipment from each of the battery packs; and (2) connecting the plurality of battery packs in series to supply power to electrical equipment after the output voltage of the plurality of battery packs has dropped to a final voltage level.

25. A method of power supply from the plurality of battery packs to electrical equipment as recited in claim 24 wherein power is supplied to electrical equipment from a plurality of battery packs, and after the output voltage of the plurality of battery packs has dropped to the final voltage level, two of the battery packs are connected in series to supply power to electrical equipment.

* * * * *